United States Patent
Graham et al.

(10) Patent No.: US 10,726,473 B1
(45) Date of Patent: Jul. 28, 2020

(54) AUGMENTED REALITY SHOPPING REWARDS

(71) Applicant: Wells Fargo Bank, N.A., San Francisco, CA (US)

(72) Inventors: Marsha Lynn Graham, Monroe, NC (US); Laurie Ann Robinson, Billings, MT (US); Kourtney Eidam, Sunnyside, NY (US); Darin J. Rock, San Francisco, CA (US); Christian E. Arnesen, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 575 days.

(21) Appl. No.: 15/388,343

(22) Filed: Dec. 22, 2016

Related U.S. Application Data

(63) Continuation-in-part of application No. 14/265,620, filed on Apr. 30, 2014, now Pat. No. 10,395,292.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0641* (2013.01); *G06Q 30/0226* (2013.01)

(58) Field of Classification Search
CPC ............... G06Q 30/00; G06Q 30/0601; G06Q 30/0631; G06Q 30/0641; G06Q 30/0643
See application file for complete search history.

(56) References Cited

U.S. PATENT DOCUMENTS

| | | | |
|---|---|---|---|
| 6,641,037 B2 | 11/2003 | Williams | |
| 8,282,491 B2 | 10/2012 | Auterio et al. | |
| 8,407,086 B2 | 3/2013 | Kusumoto et al. | |
| 8,438,110 B2 | 5/2013 | Calman et al. | |
| 8,786,399 B2 | 7/2014 | Skourup et al. | |
| 2003/0158796 A1* | 8/2003 | Balent | G06Q 10/087 705/28 |
| 2008/0226119 A1* | 9/2008 | Candelore | G06F 16/58 382/100 |
| 2008/0279481 A1* | 11/2008 | Ando | G06F 16/951 382/306 |
| 2009/0063307 A1* | 3/2009 | Groenovelt | G06Q 10/087 705/28 |
| 2009/0128335 A1* | 5/2009 | Leung | G06Q 30/0601 340/572.1 |
| 2010/0016080 A1 | 1/2010 | Garden et al. | |

(Continued)

OTHER PUBLICATIONS

Langlotz, Tobias, et al. "Next-generation augmented reality browsers: rich, seamless, and adaptive." Proceedings of the IEEE 102.2 (2014): 155-169. (Year: 2014).*

(Continued)

*Primary Examiner* — Christopher B Seibert
(74) *Attorney, Agent, or Firm* — Merchant & Gould P.C.

(57) ABSTRACT

A method implemented on an augmented reality (AR) electronic device includes obtaining a location of the AR electronic device. Information is received regarding an availability of offers or rewards at one or more retail stores nearby the location of the AR electronic device. The offers or rewards are overlaid on an augmented reality view of the location on the AR electronic device.

17 Claims, 7 Drawing Sheets

(56) References Cited

U.S. PATENT DOCUMENTS

| | | | |
|---|---|---|---|
| 2010/0046842 A1* | 2/2010 | Conwell | G06K 9/32 |
| | | | 382/218 |
| 2010/0048290 A1 | 2/2010 | Baseley et al. | |
| 2011/0029364 A1 | 2/2011 | Roeding et al. | |
| 2011/0124390 A1 | 5/2011 | Wilen | |
| 2011/0213664 A1 | 9/2011 | Osterhout et al. | |
| 2011/0221657 A1* | 9/2011 | Haddick | H04N 5/44 |
| | | | 345/8 |
| 2011/0258049 A1 | 10/2011 | Ramer et al. | |
| 2012/0122554 A1 | 5/2012 | Paquet et al. | |
| 2012/0183172 A1 | 7/2012 | Stroila | |
| 2012/0191518 A1 | 7/2012 | Nix et al. | |
| 2012/0212400 A1 | 8/2012 | Border et al. | |
| 2012/0231424 A1 | 9/2012 | Calman et al. | |
| 2012/0231814 A1 | 9/2012 | Calman et al. | |
| 2012/0232937 A1 | 9/2012 | Calman et al. | |
| 2012/0232966 A1 | 9/2012 | Calman et al. | |
| 2012/0232968 A1 | 9/2012 | Calman et al. | |
| 2012/0232976 A1 | 9/2012 | Calman et al. | |
| 2012/0232977 A1 | 9/2012 | Calman et al. | |
| 2012/0233015 A1 | 9/2012 | Calman et al. | |
| 2012/0233032 A1 | 9/2012 | Calman et al. | |
| 2012/0233072 A1 | 9/2012 | Calman et al. | |
| 2012/0256954 A1 | 10/2012 | Soon-Shiong | |
| 2012/0290366 A1* | 11/2012 | Giles | G06Q 40/02 |
| | | | 705/14.1 |
| 2013/0033522 A1 | 2/2013 | Calman et al. | |
| 2013/0051548 A1 | 2/2013 | Chavez | |
| 2013/0170697 A1 | 7/2013 | Zises | |
| 2013/0179303 A1* | 7/2013 | Petrou | G06O 30/0623 |
| | | | 705/26.61 |
| 2013/0191250 A1 | 7/2013 | Bradley et al. | |
| 2013/0197992 A1 | 8/2013 | Bao | |
| 2013/0210523 A1 | 8/2013 | Arumugam et al. | |
| 2013/0218886 A1 | 8/2013 | Graham et al. | |
| 2013/0238413 A1 | 9/2013 | Carlson et al. | |
| 2013/0278631 A1 | 10/2013 | Border et al. | |
| 2013/0281208 A1 | 10/2013 | Lyons et al. | |
| 2013/0290106 A1 | 10/2013 | Bradley et al. | |
| 2014/0028712 A1* | 1/2014 | Keating | G06T 7/246 |
| | | | 345/633 |
| 2014/0100996 A1* | 4/2014 | Klein | G06T 1/00 |
| | | | 705/27.2 |
| 2014/0100997 A1* | 4/2014 | Mayerle | G06Q 30/0276 |
| | | | 705/27.2 |
| 2014/0143105 A1* | 5/2014 | Shaw | G06Q 10/06311 |
| | | | 705/30 |
| 2014/0152847 A1* | 6/2014 | Zomet | G06Q 30/0629 |
| | | | 348/207.1 |
| 2016/0295038 A1 | 10/2016 | Rao et al. | |

OTHER PUBLICATIONS

Johnson, "Kellogg differentiates augmented reality efforts with entertainment," http://www.mobilemarketer.com/cms/news/software-technology/16473.html, Mobile Marketer, Oct. 28, 2013, 4 pages.

Rohs, "Marker-Based Embodied Interaction for Handheld Augmented Reality Games," http://citeseerx.ist.psu.edu/viewdoc/summary?doi=10.1.1.83.630, 2006, CiteSeerXβ Journal of Virtual Reality and Broadcasting, 1 page.

Fiorletta, "IBM Unveils Augmented Reality Mobile Shopping App for In-Store Engagement," http://www.retailtouchpoints.com/mobile/1737-ibm-unveils-augmented-reality-mobile-sho>, retail TouchPoints, Jul. 20, 2012, 7 pages.

Greengard, "Retail Turns to Tech to Transform the In-Store Experience," <URL: http://eu.cmo.com/content/cmo-eu/home/articles/2013/9/23/retail_turns_to_tech.print.html>, CMO, Oct. 8, 2013, 5 pages.

Langley, "Food retail apps and innovative loyalty software platform launched in Australia," http://ausfoodnews.com.au/2013/10/23/food-retail-apps-and-innovative-loyalty-software-platform-launched-in-australia.html, AFN Thought for Food, Oct. 23, 2013, 3 pages.

U.S. Appl. No. 14/265,604, filed Apr. 30, 2014 entitled "Augmented Reality Store and Services Orientation Gamification".

U.S. Appl. No. 14/265,620, filed Apr. 30, 2014 entitled "Augmented Reality Shopping Rewards".

Findling, Rainhard D., and Rene Mayrhofer. "Towards face unlock: on the difficulty of reliably detecting faces on mobile phones." Proceedings of the 10th International Conference on Advances in Mobile Computing & Multimedia. ACM, 2012. (Year: 2012).

* cited by examiner

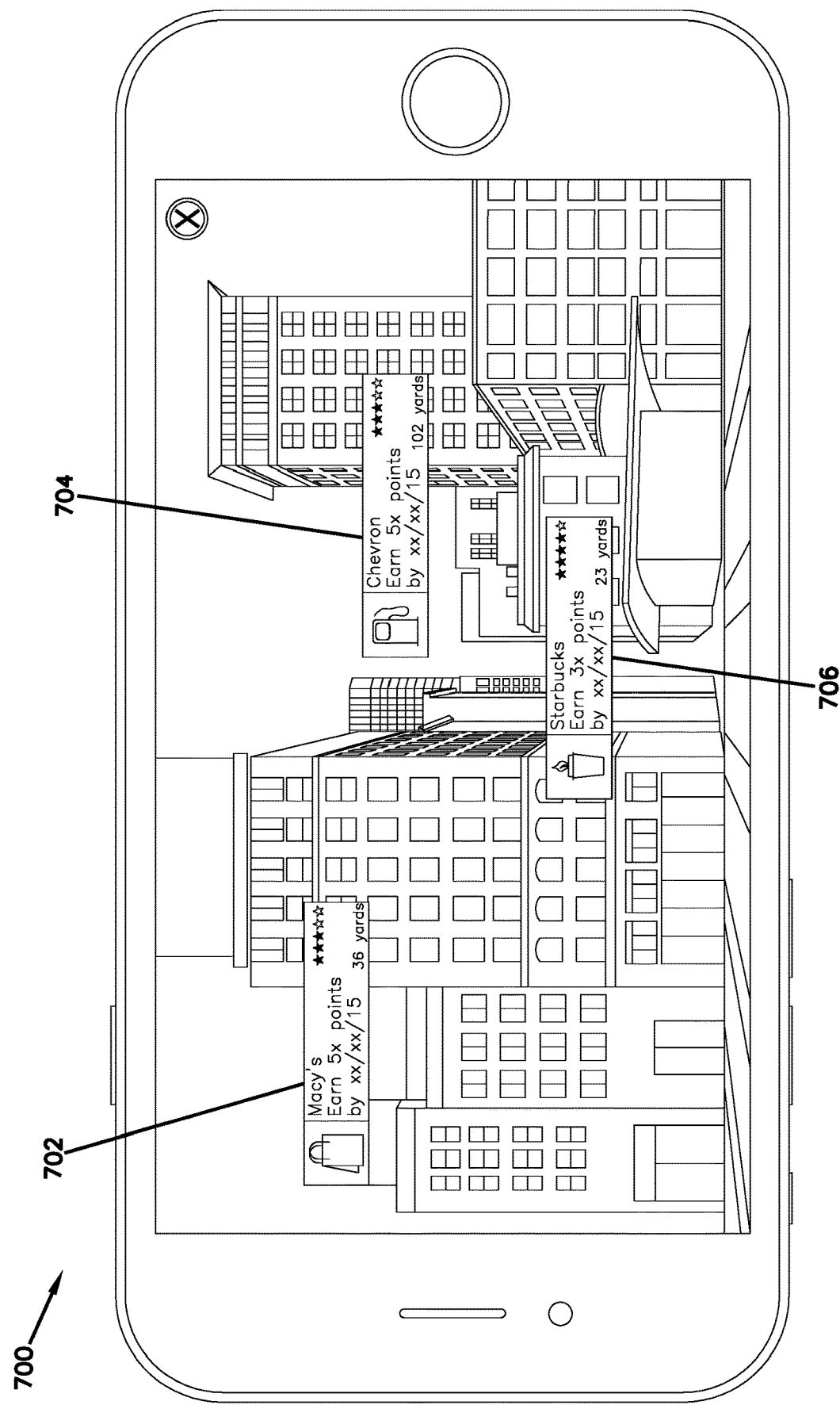

AUGMENTED REALITY SHOPPING REWARDS

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an augmented reality (AR) electronic device, the method comprising: identifying a retail store at a current location of a user of the AR electronic device; sending the identity of the retail store to a server computer; receiving from the server computer information regarding rewards card programs offered by the retail store; and displaying on the AR electronic device the information regarding the rewards card programs offered by the retail store.

In another aspect, a method implemented on an augmented reality (AR) electronic device comprises: identifying a product with the AR electronic device; identifying a user of the AR electronic device; sending the identity of the product and the identity of the user to a server computer; receiving from the server computer information regarding payment cards for the user that may be used to purchase the product at the retail store; and displaying on the AR electronic device a list of one or more payment cards for the user that offer incentives for purchasing the product.

In yet another aspect, an AR device comprises: a processing unit; and system memory, the system memory including instructions which, when executed by the processing unit, cause the AR device to: identify a product; identify a user of the AR device; obtain a global positioning system (GPS) location of a retail store at the retail store location; send the identity of the product, the identity of the retail store and the identity of the user to a server computer; receive from the server computer information regarding payment cards and loyalty card programs for the user for the product at the retail store; display on the AR device one or more combination of payment cards and loyalty cards owned by the user that offer rewards for purchasing the product, one of the combinations being a combination that offers a best price for the product; and display on the AR device one or more alternate products of a similar product category as the product for which one or more payment cards or loyalty cards for the user may be used.

The details of one or more techniques are set forth in the accompanying drawings and the description below. Other features, objects, and advantages of these techniques will be apparent from the description, drawings, and claims.

DESCRIPTION OF THE DRAWINGS

FIG. 7 shows an example graphical user interface of the AR device of FIG. 1.

DETAILED DESCRIPTION

Figure 1:
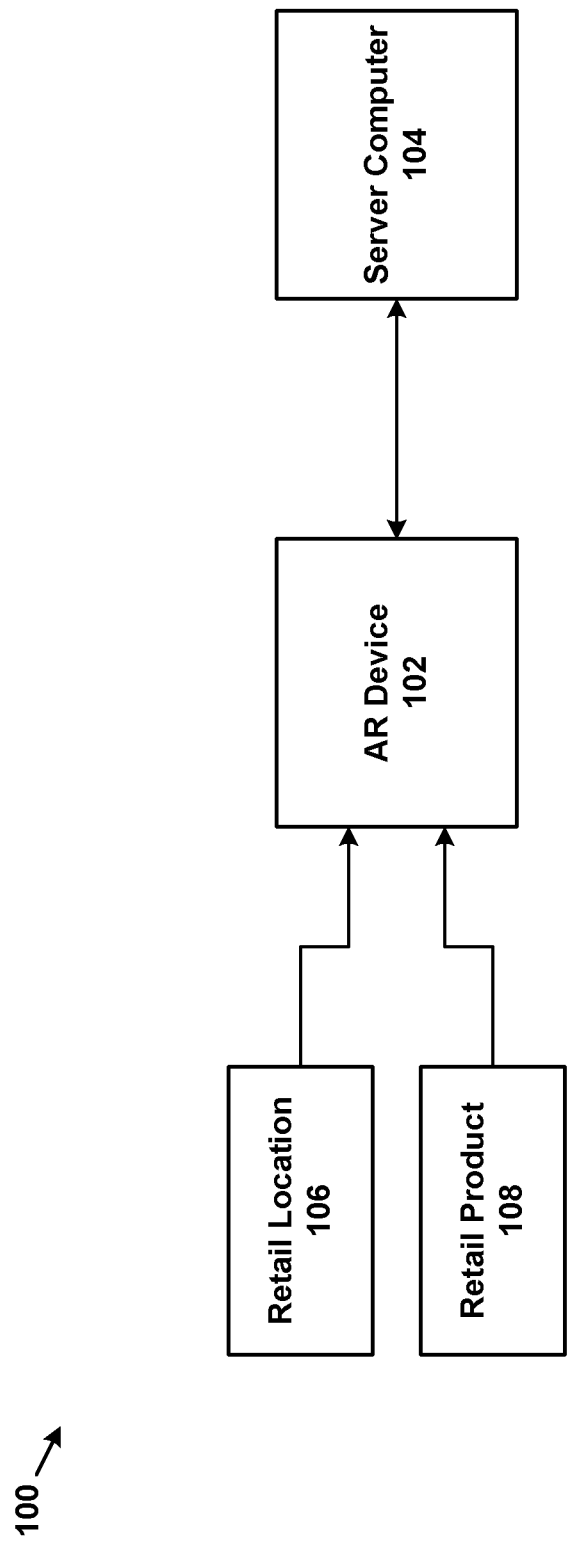
FIG. 1 shows an example system that may be used for augmented reality (AR) display of shopping reward information.

The present disclosure is directed to systems and methods for using augmented reality (AR) to provide information to users regarding rewards cards and payment cards that may be used for purchasing items when shopping. The information is displayed on a display screen of an AR device.

As used in this disclosure, a rewards card is a card that identifies a card holder as a member in a loyalty program. As used in this disclosure, a loyalty program is a marketing program that rewards customers with discounts for purchases. Typically, the customer needs to show the rewards card when making the purchase in order to obtain the discount. Rewards cards may also be known as loyalty cards, points cards, club cards and advantage cards. Other names for rewards cards are possible.

As used in this disclosure, a payment card is a credit card or a debit card. Many payment cards are also associated with rewards programs. In some rewards programs, a user may obtain cash back for selected purchases made with the payment card. The cash back amount is typically a percentage of the amount of the purchase, for example one percent, five percent, or another percentage. In some rewards programs, rewards points may be used in lieu of cash back. The rewards points may be accumulated and eventually cashed in for products, trips, entertainment, etc. As used in this disclosure rewards may include any combination of cash back, rewards points and discounts.

The systems and methods are generally described for an AR device that may be worn or carried by a user. An example of and AR device that may be worn by the user is an AR headset. An example of an AR device that may be carried by the user is a smart telephone or tablet computer that includes AR components such as a processor, display and camera and an AR software application.

The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, Calif.

In order for the AR device to display information regarding the rewards cards and the payment cards, the user of the AR device needs to be identified. Once identified, account information for the user may be obtained. The user of the AR device is typically identified via one of several methods including, facial recognition, retinal scan capability, finger print or voice print. Other methods for identifying the user may be used.

Using the systems and methods, rewards card and payment card information may be displayed to the user on the AR device when the user is shopping. For example, the user may be walking near a retail store at a shopping mall. Based on an identification of the retail store and an identification of the user, the AR device may display information regarding whether the retail store accepts rewards cards for the user. The AR device may also display a list of other similar retail stores nearby that accept rewards cards for the user.

When the user enters the retail store, the user may scan one or more products with the AR device. Using the systems and methods, the AR device may display whether discount programs are available for purchasing the one or more products. In addition, the AR device may display a list of payment cards that offer cash back or rewards points for purchasing the one or more products.

FIG. 1 shows an example system 100 that supports a display of shopping reward information on an AR device. System 100 includes an AR device 102, a server computer 104, a retail location 106 and a retail product 108. The AR device 102 may be an AR headset or a smart telephone or tablet computer having a processor, display, camera and AR software application. The server computer 104 is typically a server computer associated with a financial institution, such as a bank. The retail location 106 is a location of a retail store, for example a location in a shopping mall. The retail product 108 is a product that a user of the AR device 102 may purchase.

In an example implementation, the user may be walking in a shopping mall. As the user walks in the shopping mall the user may stop in front of a retail store in the shopping mall. The user may be curious as to whether the retail store has a rewards program that accepts one or more rewards cards that the user possesses. If so, the user may want to shop in the retail store because the user may be able to obtain discounted prices when using one of the rewards cards to purchase merchandise in the retail store.

The user may initiate an action to obtain information regarding rewards programs for the retail store. For example, the user may issue a verbal command, such as "rewards program" or the user may touch a specific area on AR device 102. In conjunction with initiating the action, the camera on the AR device 102 may scan or take a picture of signage or a logo at the retail store, for example a sign with the name of the retail store or a logo of the retail store. AR device 102 may include object recognition software which may identify the retail store based on the signage or logo.

AR device 102 may also GPS data for the retail location 106. The GPS data is obtained via GPS software included on AR device 102. In addition, AR device 102 obtains identification information for the user of AR device 102. The identification information is typically obtained by one of facial recognition, retinal scan, voice print or finger print.

AR device 102 sends the identifier for the retail store, the identifier for the user and the GPS data to server computer 104. Server computer 104 determines from this information whether rewards programs are available for the user at the retail location 106. When a determination is made that rewards programs are available for the user at the retail location 106, server computer 104 sends information regarding the rewards programs to AR device 102. When a determination is made that rewards programs are not available for the user at retail location 106, server computer 104 may determine that rewards programs are available for similar retail stores nearby retail location 106. For example, if the retail store at retail location 106 is a home products store, the server computer may determine that there is another home products store nearby retail location 106 in which a rewards program is available for the user.

The information from server computer 104 is displayed to the user on a display screen of AR device 102. Typically, the information is displayed as an overlay on the display screen of AR device 102. In addition to providing information on whether the retail store at retail location 106 accepts rewards cards for the user and in addition to providing alternate locations nearby, the information may include a recommendation as to which of the retail store at the current location or the retails stores at the alternate locations offers better prices or discounts.

In another example implementation, the user may enter a retail store and consider buying a product at the retail store. The user may want to know whether there are any rewards card or payment card discounts available for this product. The user may focus AR device 102 on the product to identify the product. The AR device 102 may be used to identify the product in one of several ways. In one way, the AR device 102 may scan the product or scan an optical code, such as a bar code for the product. The product may be identified by the optical code or by object recognition. In some implementations, near-field communication (NFC) may be used to identify the product.

The user may also initiate an activating action such as a verbal command or touching an area on AR device 102. After the activating action, AR device 102 may send an identifier for the product and an identifier for the user to server computer 104. Server computer 104 may determine whether rewards card or payment card discounts are available for the user when purchasing the product. When this determination is made, server computer 104 may send information to AR device 102 regarding the rewards card and payment card discounts. This information is displayed on the display screen of AR device 102.

In addition to providing information regarding which rewards cards or payment cards may be used to purchase the product, the information may include suggestions or advice for alternate products that may offer better rewards. For example, if the user is interested in purchasing a specific brand of ketchup, server computer 104 may determine that a better combination of reward points, cash back, discounts, etc. may be obtained by buying an alternate brand of ketchup. In addition, if the user has multiple payment cards, the information may indicate which payment card may offer the most rewards. In some implementations, the information may include an optimization of rewards cards and payment cards that provides the best rewards when purchasing the product.

Typically, when a retail store is part of a rewards program, a customer may need to physically present a rewards card when making a rewards program purchase at the retail store. However, using the systems and methods, a rewards card entity may partner with a payment card entity such that when the payment card is used to purchase a product, any discounts from the rewards card are automatically included in the purchase price for the product. In this way, the customer may not need to carry the rewards card or physically present the rewards card when making the purchase.

Using the systems and methods, another way to associate a rewards card with a payment card is via a digital dashboard. The digital dashboard comprises a user interface of a computing device, for example a financial services software application accessible from a smart telephone or tablet computer. As explained in more detail later herein, a user may enter his/her rewards cards and loyalty cards into the user interface. Information regarding the user's rewards cards and loyalty cards are sent to server computer 104.

Figure 2:
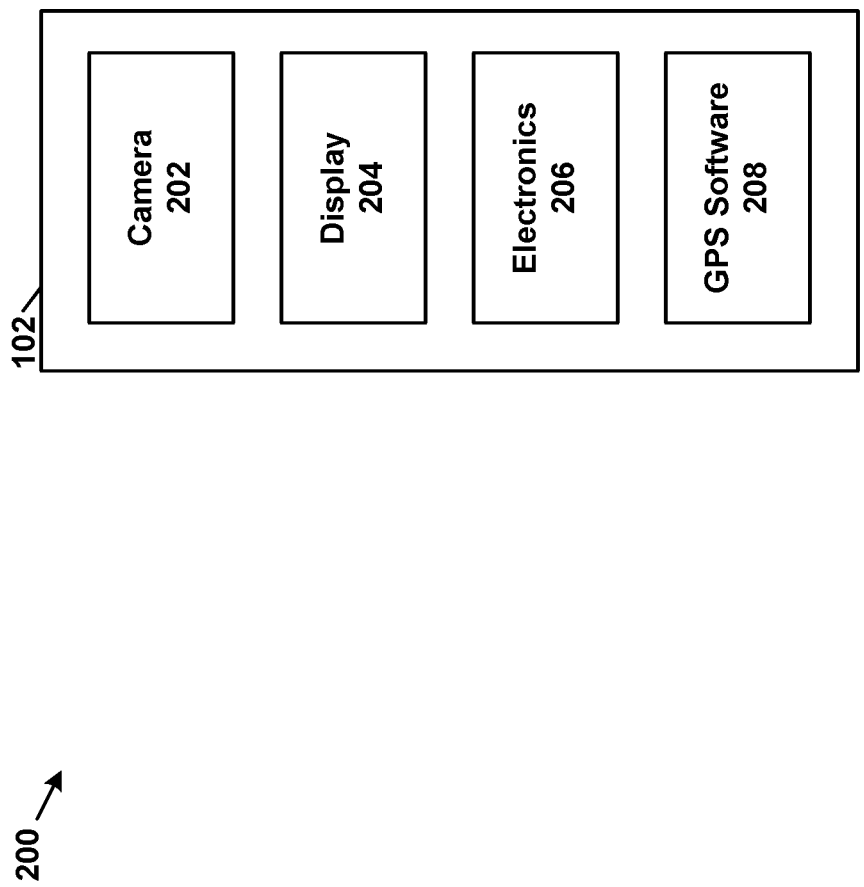
FIG. 2 shows example modules of the AR device of FIG. 1.

FIG. 2 shows example modules 200 of AR device 102. The example modules 200 include a camera 202, a display 204, electronics 206 and GPS software 208. The camera 202 is a camera that is built-in to AR device 102. Display 204 is a display that is also built-in to AR device 102. Electronics 206 includes an electronic computing device with wireless capability. The wireless capability may include Bluetooth, radio frequency identification (RFID) or similar types of wireless capability. GPS software 208 is typically a software application that may be installed on the mobile electronic device. When AR device 102 is an AR headset, camera 202, display, 204, electronics 206 and GPS software 208 are part of the AR headset.

The GPS software 208 determines a GPS position of the retail store. In some implementations, GPS position information of the retail store is sent to the server computer 104. The GPS position information is processed at the server computer 104 and a type of retail store at the GPS position is determined. The processing of the GPS position information may comprise using the GPS position information in an application program interface (API) in which a retail store name and type may be determined from the GPS position information. In some implementations the processing of the GPS position information may include decoding the GPS position information in order to determine an actual GPS position.

Figure 3:
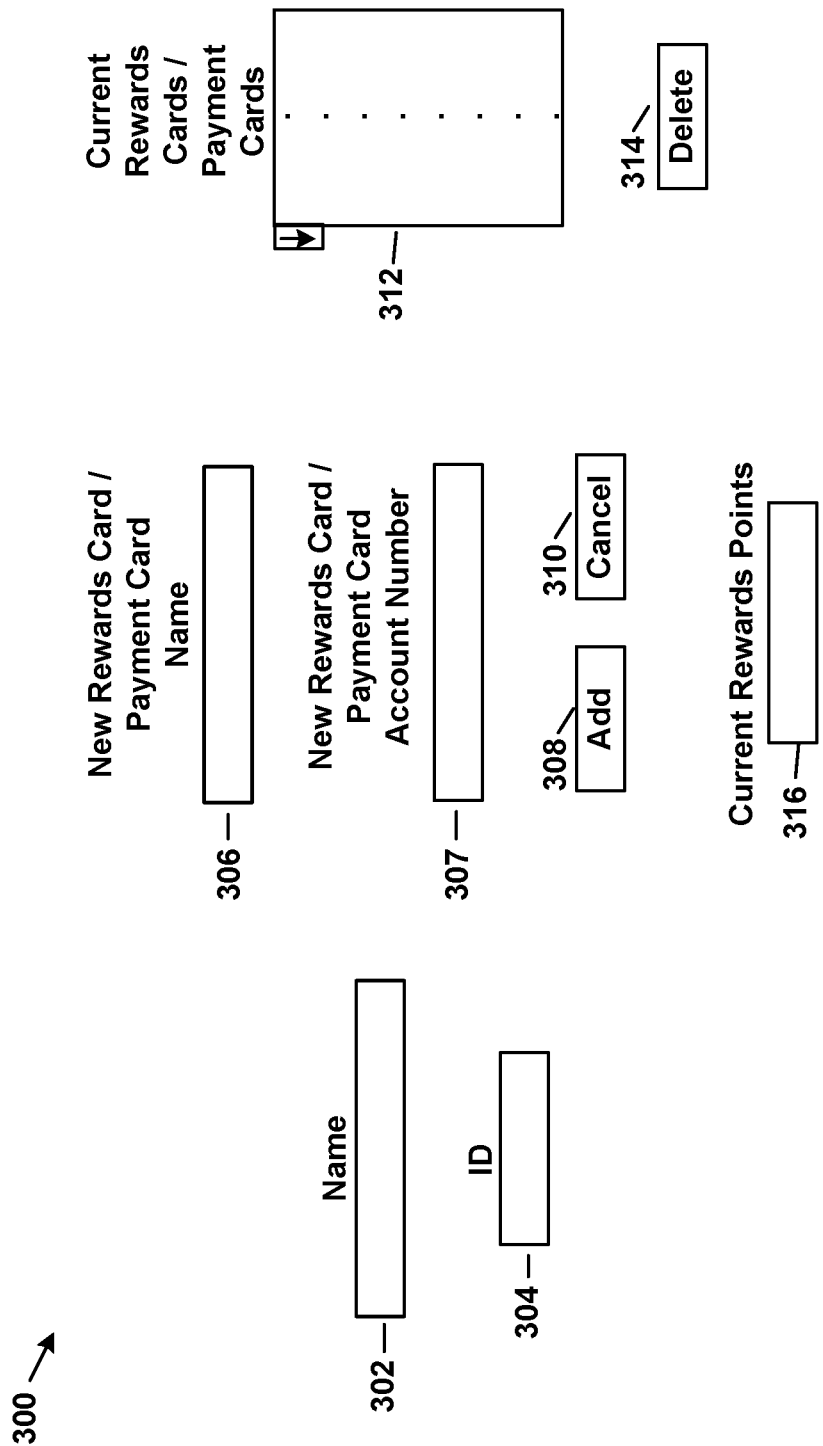
FIG. 3 shows an example user interface for a digital dashboard.

FIG. 3 shows an example user interface 300 for the digital dashboard. The example user interface 300 includes edit boxes for entering a name 302 and ID 304. The user interface 300 also includes edit boxes 306 and 307 for entering information for new rewards cards and payment cards. A name for the rewards card or payment card is entered into edit box 306 and an account number for the rewards card or payment card is entered into edit box 307. The example Add button 308 is then selected. When the Add button 308 is selected, the rewards card or credit card information entered into edit boxes 306 and 307 is sent to server computer 104. The name of the rewards card or credit card is also displayed in a current rewards cards/payment cards pull-down list box 312. An example Cancel button 310 is provided for canceling an entry of a rewards card or payment card in edit box 306.

The current rewards cards/payment cards pull-down list box 312 includes a list of all rewards cards and payment cards currently entered into system 100 for the user. The user may delete a rewards card or payment card from system 100 by selecting the rewards card or payment card to be deleted and then selecting the example Delete button 314.

The user interface 300 also includes a text box for current rewards points 316. The current rewards points 316 displays an amount of rewards points currently available to the user. When a purchase of a product is made and reward points are provided as a result of the purchase, the current rewards points 316 is increased by the amount of rewards points obtained from the purchase of the product.

Figure 4:
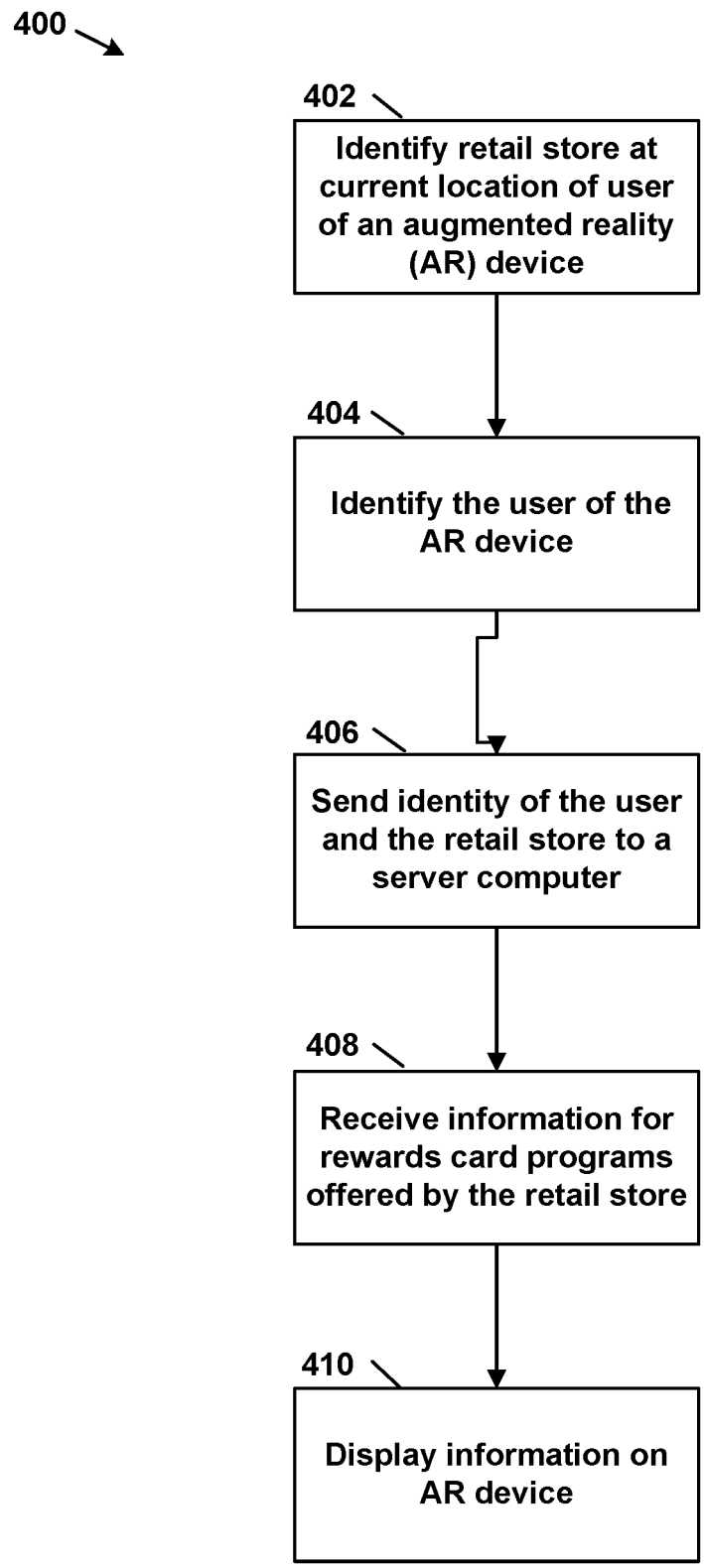
FIG. 4 shows a flowchart for an example method implemented on the AR device of FIG. 1 for displaying rewards card program information for a retail store on the AR device of FIG. 1.

FIG. 4 shows a flowchart of a method 400 implemented on an AR device for displaying rewards card program information for a retail store on a display screen of the AR electronic device. For the method 400, the AR device, for example AR device 102, is a smart glass type of headset such as Google Glass.

At operation 402, a retail store at a current location of the AR device is identified. In an example scenario, a user of the AR device is at a shopping mall and stops in front of a retail store. The user views signage of the retail store name with camera of the AR device. For the method 400, optical recognition software included on the AR device identifies the retail store from the signage. In addition, GPS software on the AR device determines a GPS location for the retail store.

At operation 404, the user of the AR device is identified. The user is identified by a biometric method of identification such as facial recognition, retinal scan, voice print or finger print scan. For example, when facial recognition is used, the camera on the AR device scans an image of the user's face. Optical recognition software on the AR device than compares the scanned image with a stored image of the user to confirm that the wearer of the AR device is the user.

At operation 406, when a determination is made that the wearer of the AR device is the user, an identifier for the user and an identifier for the retail store is sent to a server computer, for example to server computer 104. The identifier for the user may be the name of the user, a banking account number for the user or a special identifier for the user. The identifier for the retail store may be the name of the retail store, a special identifier for the retail store or the name or special identifier of the retail store combined with the GPS location for the retail store. Other identifiers are possible.

At operation 408, the server computer sends information to the AR device regarding rewards card programs offered to the user by the retail store. The rewards card programs are typically loyalty programs in which a user obtains discounts for using a rewards card associated with the loyalty program. The information may specify the rewards card programs, if any, that may be used at the retail store. The information may also specify an amount of any discounts available to the user at the retail store via the loyalty program. In some implementations, the information may also include alternate retail stores nearby that may offer rewards programs for the user. By viewing the rewards programs available at the alternate retail stores, the user may decide to shop at one of the alternate retail stores because the user may be able to get a better price or discount at one of the alternate retail stores.

At operation 410, the information is displayed on the display screen of the AR device. In some implementations, the displayed information may indicate which rewards programs offer a better deal for the user and may provide advice as to which rewards cards should be used and which alternate retail stores should be used.

Figure 5:
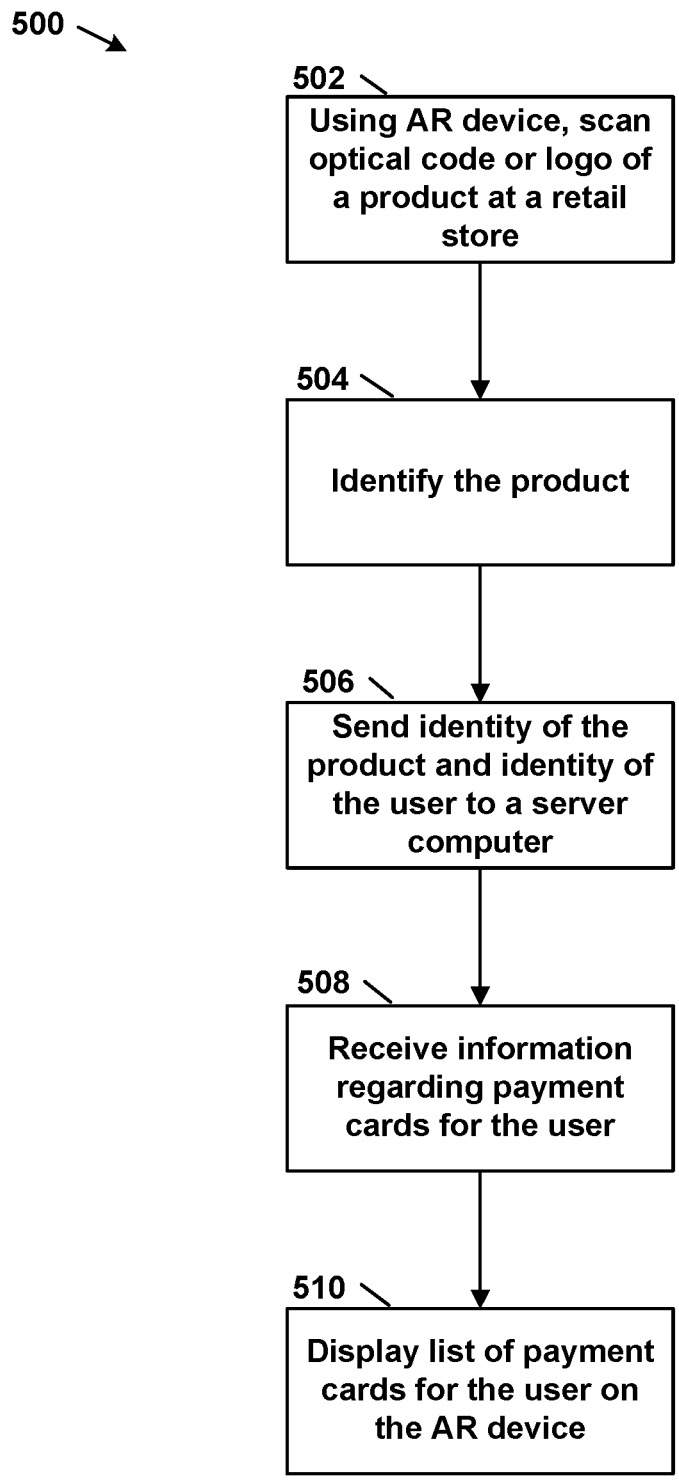
FIG. 5 shows a flowchart for an example method implemented on the AR device of FIG. 1 for displaying payment card information for a product purchased at a retail store on the AR device of FIG. 1.

FIG. 5 shows an example method 500 implemented on an AR device for displaying payment card information for a product purchased at a retail store. The information is displayed on a display screen of the AR electronic device, for example a display screen of AR device 102. For the method 500, the AR device is a smart glass type of headset such as Google Glass.

At operation 502, a user of the AR device scans an optical code or logo of a product at a retail store. The optical code or logo is scanned by a camera on the AR device when the user views the optical code or logo with the AR device. For the example method 500, the optical code is a bar code.

At operation 504, optical recognition software on the AR device is used to identify the product. The product may be identified by determining the product from recognition of the logo or by comparing the bar code of the product with bar codes of products stored or accessed from the AR device.

At operation 506, the identity of the product and the identity of the user are sent to a server computer, for example to server computer 104. At operation 508, information regarding payment cards for the user that may be used to purchase the product is received from the server computer from the AR device. The information may include a description regarding one or more payment cards that may be used, including reward points and cash awards that may be available when purchasing the product using each of the payment cards.

At operation 508, a list of the payment cards is displayed on the display screen of the AR device. In addition, information regarding possible rewards points and cash awards available for using each of the payment cards is also displayed. By viewing the information, the user can determine which payment card would be best to use when purchasing the product.

Figure 6:
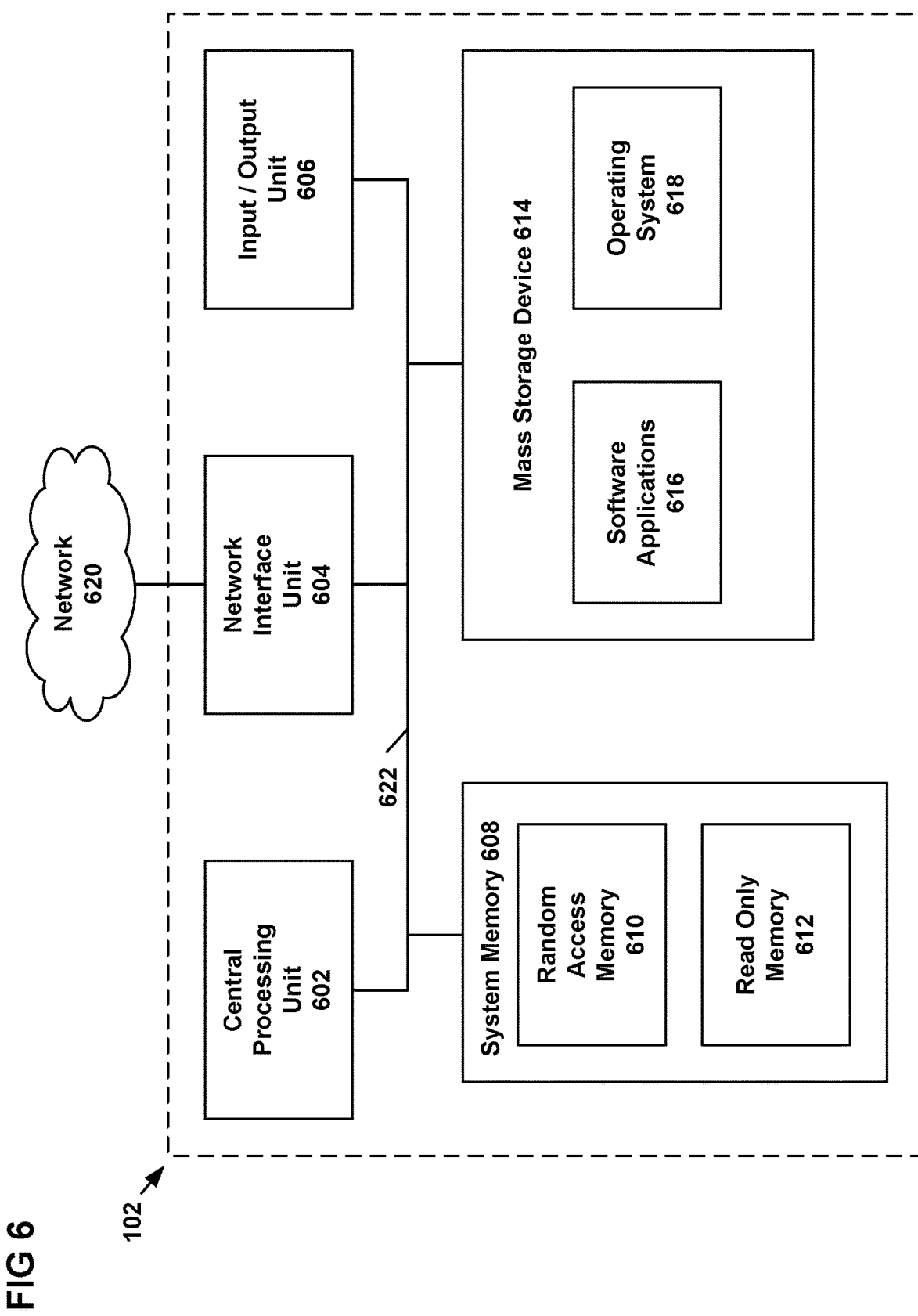
FIG. 6 shows example physical components of the AR device of FIG. 1.

As illustrated in the example of FIG. 6, the AR device 102 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the AR device 102, such as during startup, is stored in the ROM 612. The AR device 102 further includes a mass storage device 614. The mass storage device 614 is able to store software instructions and data. A central processing unit, system memory and mass storage device similar to that in FIG. 6 are also included in server computer 104.

The mass storage device 614 is connected to the CPU 602 through a mass storage controller (not shown) connected to the system bus 622. The mass storage device 614 and its associated computer-readable data storage media provide non-volatile, non-transitory storage for the AR device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the AR device 102.

According to various embodiments of the invention, the AR device 102 may operate in a networked environment using logical connections to remote network devices through the network 620, such as a wireless network, the Internet, or another type of network. The AR device 102 may connect to the network 620 through a network interface unit 604 connected to the system bus 622. It should be appreciated that the network interface unit 604 may also be utilized to connect to other types of networks and remote computing systems. The AR device 102 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the AR device 102 can store software instructions and data. The software instructions include an operating system 618 suitable for controlling the operation of the AR device 102. The mass storage device 614 and/or the RAM 610 also store software instructions, that when executed by the CPU 602, cause the AR device 102 to provide the functionality of the AR device 102 discussed in this document. For example, the mass storage device 614 and/or the RAM 610 can store software instructions that, when executed by the CPU 602, cause the AR device 102 to display received financial data on the display screen of the AR device 102.

The AR device (AR device 102) also supports push notifications of offers and rewards. In an example implementation, when server computer 104 determines that the user of AR device 102 is viewing a street scene with AR device 102, server computer 104 can determine that one or more merchants that are in a view of the street scene can provide offers or rewards to the user. Server computer 104 can send a push notification to AR device 102 that can inform the user of AR device 102 that rewards are available.

The push notification can take the form of a toast, pop-up window, a message or other form. An example push notification message can be "Rewards are closer than you think." When the user clicks on the push notification, AR device 102 can display the offers or rewards on AR device 102. The offers or rewards can be displayed as an overlay near an image of the merchant on the view of the street scene.

FIG. 7 is an example view of a graphical user interface 700 of AR device 102. In this example, the graphical user interface 700 is a view of a portion of a scene or street, shown in augmented reality on the AR device 102.

The graphical user interface 700 can be displayed when the user views the street scene via a camera on AR device 102. When the user has a financial account at the financial institution associated with server computer 104, AR device 102 can detect and send a GPS location of AR device 102 to server computer 104. AR device 102 can also send the image being viewed on AR device 102 to server computer 104. Server computer 104 can identify merchants in the view of the street scene that are providing offers and rewards and send a notification of the offers and rewards to AR device 102. Server computer 104 can also send AR device 102 information regarding where to position the offers and rewards on the view of the street scene. For example, the information can be imbedded in the image of the view of the street scene and sent to AR device 102.

As shown in FIG. 7, the information can include a name of the retailer, a description of the offer and a distance of the retailer from AR device 102. For example, FIG. 7 shows that three offers are currently available. A first offer 702 is from Macy's. The first offer is to earn 5 times a normal amount of rewards points for purchases made by a certain date, in this case by xx/xx/2015. The first offer 702 also shows that Macy's is 36 yards from AR device 102. A second offer 704 is from Chevron. The second offer is to earn 5 times a normal amount of rewards points for purchases made by xx/xx/2015. The second offer 704 also shows that Chevron is 102 yards from AR device 102. A third offer 706 is from Starbucks. The third offer 706 is to earn 3 times a normal amount of rewards points for purchases made by xx/xx/2015. The third offer 706 also shows that Starbucks is 23 yards from AR device 102.

When server computer 104 can determine an identity of the user of AR device 102, server computer 104 can provide more personalized offers to the user of AR device 102. For example, the financial institution can have a working agreement with one or more of Macy's, Chevron and Starbucks to provide additional offers from these retailers to customers of the financial institution. For example, the financial institution may be able to provide an offer of additional rewards points to the customer for shopping at these retailers.

Server computer 104 can determine the identity of the user of AR device 102 in one or several ways. One way may be to identify a computer cookie from AR device 102 when AR device 102 sends information to server computer 104. Server computer 104 may be able to identify the user of AR device 102 via the computer cookie. Alternatively, AR device 102 may be able to identify the user of AR device 102 via a biometric method of identification such as finger print, facial scan, retinal scan or voice print. When AR device 102 determines the identity of the user of AR device 102, AR device 102 can send the identity of the user to server computer 104.

In addition, the user can set a marketing preference to opt-in to receive special offers or rewards using AR device 102. Opt-in permits server computer 104 to learn a location of AR device 102 and inform server computer 104 as to an extent to which the user needs to be identified to extend an initial offer. For example, if the user is at the user's home or a known location, less authentication of the user's identity may be needed than if the user were in a foreign country.

In some implementations, server computer 104 can send AR device 102 a unique code that the user can use to purchase products. For example, the unique code can comprise a redemption coupon that is valid at a local retailer for a defined period of time. The redemption code can be activated via a scan of the display screen of AR device 102 by the local retailer at the time of a product purchase at the local retailer or by other means via a connection between the local retailer and server computer 104. The use of the unique code can be an important part of an offer program than can include limiting participation, time bounding of offers and tracking response rates to offers.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an augmented reality (AR) electronic device, the method comprising:
   obtaining a location of the AR electronic device using a global positioning system (GPS) of the AR electronic device, the AR electronic device also including a graphical user interface;
   identifying, using the GPS of the AR electronic device, a plurality of retail stores nearby the obtained location of the AR electronic device;
   receiving information regarding an availability of offers or rewards at the plurality of retail stores nearby the location of the AR electronic device;
   determining a surrounding environment being viewed through the AR electronic device by a user of the AR electronic device, the surrounding environment including the plurality of retail stores;
   determining a type of user authentication using the GPS of the AR electronic device;
   authenticating, using the AR electronic device and based on the determined type of user authentication, the user of the AR electronic device;
   displaying an image of the surrounding environment on the graphical user interface of the AR electronic device that includes the plurality of retail stores; and
   overlaying, with a plurality of graphical elements, the offers or rewards on an augmented reality view of the surrounding environment displayed on the graphical user interface of the AR electronic device, with each respective graphical element including a respective offer or reward, the graphical elements being displayed at the same time on the graphical user interface and each of the graphical elements being positioned near an image within the augmented reality view of the corresponding retail store of the plurality of retail stores associated with the respective offer or reward.

2. The method of claim 1, wherein receiving the information comprises receiving a notification regarding the availability of the offers or rewards.

3. The method of claim 2, further comprising:
   receiving an affirmative response to the notification; and
   as a result of receiving the affirmative response to the notification, receiving the offers or rewards.

4. The method of claim 1, wherein the information includes a number of reward points that can be obtained by shopping at a retail store corresponding to one or more of the rewards or offers.

5. The method of claim 1, wherein the information includes a distance from the AR electronic device to one or more of the retail stores.

6. The method of claim 1, wherein the information displayed for each reward or offer includes a logo of a retail store making the reward or offer.

7. The method of claim 1, wherein the information is sent to the AR electronic device from a server computer.

8. The method of claim 1, further comprising:
   determining an identity of a user of the AR electronic device; and
   receiving one or more offers or rewards tailored to the user of the AR electronic device.

9. The method of claim 1, wherein the information comprises a pop-up message that is displayed on the AR electronic device.

10. A method implemented on an augmented reality (AR) electronic device, the method comprising:
    obtaining a location of the AR electronic device using a global positioning system (GPS) of the AR electronic device, the AR electronic device also including a graphical user interface;
    identifying, using the GPS of the AR electronic device, a first retail store at the obtained location of the AR electronic device;
    receiving information regarding rewards card programs offered by the first retail store;
    receiving information regarding rewards card programs offered at nearby alternate retail stores;

determining a surrounding environment being viewed through the AR electronic device by a user of the AR electronic device, the surrounding environment including the first retail store;

determining a type of user authentication using the GPS of the AR electronic device;

authenticating, using the AR electronic device and based on the determined type of user authentication, the user of the AR electronic device;

displaying on the AR electronic device the information regarding the rewards card programs offered by the first retail store and the information regarding the rewards card programs offered by the nearby alternate retail stores, including:

displaying an image of the surrounding environment on the graphical user interface of the AR electronic device that includes the nearby alternate retail stores; and overlaying, with a plurality of graphical elements, the rewards card programs on an augmented reality view of the surrounding environment displayed on the graphical user interface of the AR electronic device, with each respective graphical element including a respective rewards card program, the graphical elements being displayed at the same time on the graphical user interface and each of the graphical elements being positioned near an image within the augmented reality view of the corresponding first retail store or a corresponding one of the alternate retail stores associated with the respective rewards card program.

11. The method of claim 10, further comprising:

identifying a product at the retail store with the AR electronic device;

identifying a user of the AR electronic device;

receiving information regarding payment cards for the user that may be used to purchase the product at the retail store; and displaying on the AR electronic device a list of one or more payment cards for the user that offer incentives for purchasing the product.

12. The method of claim 11, further comprising displaying on the AR electronic device alternative choices of one or more combinations of payment cards and rewards cards that can be used to purchase the product, the display including a combination of payment cards and rewards cards that offer an optimum combination for purchasing the product.

13. The method of claim 11, further comprising displaying on the AR electronic device a list of the nearby alternate retail stores that may offer a better combination of payment cards and rewards cards for a purchase of the product than the combination of payment cards and rewards cards offered at the retail store at the current location.

14. The method of claim 11, further comprising displaying on the AR electronic device a list of alternate products of a similar product category as the product for which one or more payment cards or rewards cards may be used.

15. The method of claim 10, further comprising using a biometric identification method to obtain an identity of a user of the AR electronic device, wherein the biometric identification method is one of retinal scan, facial recognition, voice recognition or finger print scan.

16. The method of claim 10, wherein identifying the retail store at the current location of the AR electronic device comprises one or more of scanning a sign or logo of the retail store and identifying the retail store from the sign or the logo and using the GPS of the AR electronic device to obtain a location of the retail store and identifying the retail store from the location of the retail store.

17. An augmented reality (AR) device comprising:

a processing unit; and system memory, the system memory including instructions which, when executed by the processing unit, cause the AR device to:

obtain a location of the AR electronic device using a global positioning system (GPS) of the AR electronic device, the AR electronic device also including a graphical user interface;

identify, using the GPS of the AR electronic device, a plurality of retail stores nearby the obtained location of the AR electronic device;

determine a street scene being viewed through the AR electronic device by a user of the AR electronic device, the street including the plurality of retail stores;

determine a type of user authentication using the GPS of the AR electronic device;

determine an identity of a user of the AR electronic device;

authenticate, using the AR electronic device and based on the determined type of user authentication, the identified user of the AR electronic device;

using the identity of the user to provide tailored reward opportunities for the user;

receive a push notification of an availability of offers or rewards at the plurality of retail stores near the obtained location of the AR electronic device, at least some of the offers or rewards being tailored to the user of the AR electronic device;

as a result of responding in an affirmative manner to the push notification, receive at the AR electronic device information regarding the offers or rewards, the information including a number of reward points that can be obtained by shopping at each of the plurality of retail stores, the information including a time period in which each of the offers or rewards are valid, the information also including a distance from the AR electronic device to each of the plurality of retail stores;

display an image of the street scene on the graphical user interface of the AR electronic device that includes the plurality of retail stores; and display the information regarding the offers or rewards as an overlay on the image of the street scene displayed on the graphical user interface of the AR electronic device, including:

overlay, with a plurality of graphical elements, the offers or rewards on an augmented reality view of the street scene displayed on the graphical user interface of the AR electronic device, with each respective graphical element including, for the corresponding one of the plurality of retail stores: the corresponding offer or reward, the corresponding time period, and the corresponding distance, the graphical elements being displayed at the same time on the graphical user interface and each of the graphical elements being positioned near an image within the augmented reality view of the corresponding retail store.

* * * * *